US007562169B2

(12) United States Patent
Zhigang et al.

(10) Patent No.: US 7,562,169 B2
(45) Date of Patent: Jul. 14, 2009

(54) VIDEO AND AUDIO FRONT END ASSEMBLY AND METHOD

(75) Inventors: Yao Zhigang, San Diego, CA (US); Qiu Yang, San Diego, CA (US); Jun Ye, San Diego, CA (US); Christopher Thomas, San Diego, CA (US)

(73) Assignee: Symwave, Inc., Laguna Niguel, CA (US)

( * ) Notice: Subject to any disclaimer, the term of this patent is extended or adjusted under 35 U.S.C. 154(b) by 403 days.

(21) Appl. No.: 11/323,916

(22) Filed: Dec. 30, 2005

(65) Prior Publication Data

US 2007/0174895 A1 Jul. 26, 2007

(51) Int. Cl.
G06F 13/12 (2006.01)
(52) U.S. Cl. .............................. 710/68; 710/59; 710/69; 710/313
(58) Field of Classification Search .................. 710/21, 710/29, 30, 38, 59, 68, 69, 313
See application file for complete search history.

(56) References Cited

U.S. PATENT DOCUMENTS

| 7,333,149 B2 * | 2/2008 | Choi .......................... 348/441 |
| 2002/0145610 A1* | 10/2002 | Barilovits et al. ........... 345/538 |
| 2003/0137604 A1* | 7/2003 | Takashimizu et al. ....... 348/554 |
| 2008/0095433 A1* | 4/2008 | Johnson et al. ............. 382/169 |

* cited by examiner

Primary Examiner—Niketa I Patel
Assistant Examiner—Jasjit S Vidwan
(74) Attorney, Agent, or Firm—Steins & Associates, P.C.

(57) ABSTRACT

A Video and Audio Front End Assembly and Method. The device and method of this invention takes advantage of the hardware improvements available in personal computing machines that enable higher speed bus communications and much greater computational capacity. The system converts many of the processes needed to convert analog video and audio inputs so that they are displayable by a personal computer from a hardware integrated circuit to a set of software routines. The system combines a simplified hardware front-end interface between the computer and the analog input signals and a very flexible set of software applications running on the host computer. The hardware front end employs an integrated circuit device that is much lower in complexity and cost than the conventional audio/video decoder integrated circuit. The software back end provides performance that is equal to the prior hardware-based systems, while also having the substantial benefit of being upgradable at virtually no cost to respond to changing user requirements and technological evolutions in the decoding arena.

14 Claims, 8 Drawing Sheets

VIDEO AND AUDIO FRONT END ASSEMBLY AND METHOD

BACKGROUND OF THE INVENTION

1. Field of the Invention

This invention relates to computer hardware and software and, more specifically, to a Video and Audio Front End Assembly and Method.

2. Description of Related Art

Video and audio data signal streams have historically been created, transmitted and displayed in analog format. Most televisions today still accept video and audio signals in analog form and display them without conversion into digital form With the advent of digital televisions and the growing wave of digital broadcast signals, the long-term evolution will be towards creating video in digital format and then maintaining the digital form throughout the transmission and display processes.

That being said, there remains a significant portion of analog video and audio data, both in recorded form and in broadcast form. To use this data in a digital display device, such as a conventional computer, the analog data stream must be converted into digital form. This analog to digital conversion is being done by video decoding assemblies, usually found as subassemblies or "cards" plugged into the "motherboard" of the computer. FIG. 1 depicts the general functionality of a conventional video decoding assembly 10.

The decoding assembly 10 accepts an analog video (and audio) input stream 12, and converts it into a digital video stream in a standard display format 14. Examples of standard display formats include NTSC (adopted in the United States) and PAL (adopted in Europe). While both of these formats are analog, they are not compatible because of their differences in color modulation, field rates, line rates, format and resolution, a signal in PAL format cannot be displayed by a display device designed for NTSC format and vice versa. If we turn to FIG. 2, we can examine the video decoding assembly more closely.

FIG. 2 is a block diagram depicting the subassemblies contained within the conventional video decoding assembly 10. The assembly 10 is typically a circuit substrate 16 having an input receptacle 18 for accepting the analog video/audio input stream 12. The circuit substrate 16 (or "card") has a plug-in interface built into its bottom edge so that it can be plugged into a "bus" located on the motherboard of the host computer. In order to handle the high-volume data flow of today's digital video, the typical assembly 10 is built to interface with a PCI Parallel bus 32 provided on the motherboard. The conventional PCI Parallel Bus handles a 32-bit or 64-bit data stream (which is the maximum provided on conventional motherboards). New high-performance peripherals require the use of a modem high-speed serial transport such as the PCI Express bus to handle higher data throughput and lower system costs. A PCI Express bus has one or more Lanes of differential transmit and receive pairs, requiring only four signals per Lane while achieving higher data throughput than the parallel 32-bit or 64-bit legacy PCI bus. Examples of devices that use the PCI Express bus include Gigabit Ethernet, Graphics Processors, and IEEE 1394B interfaces.

The assembly 10 has an analog front end (not shown) that receives and conditions the incoming analog video signal 12. Once conditioned, the analog data is passed through an analog-to-digital converter 22. The now-digitized signal then passes through a Channel Matched Filter device 26 and a device for Separating the Audio and Video streams 28 from the input signal stream. The video and audio data streams are then passed to the Video Decoder Device 30V for conversion into the final standardized digital format for display, and to the Audio Decoder Device 30A for conversion into the final standardized audio format for sound. The outputs of the video decoder device 30V and audio decoder device 30A (which are the outputs of the video and audio decoder assembly), denoted here by 14V and 14A, pass through the PCI parallel bus 32 to the host computer 34. A video display software application 36V running within the host computer 34 displays the output 14V of the device 30V on the computer's display and plays the output 14A of the device 30A on the computer's sound system Alternatively, certain devices 30V and 30A will scale the video and process the audio output within the device 44, and not within the host computer.

The problem with the conventional hardware-based video decoding approach is that these devices 30A, 30V ("chips") are very expensive as compared to the other circuits the make up the host computer and its input interfaces. Furthermore, as mentioned above, the video decoder devices are not cross-compatible with other digital formats. An NTSC device 30V cannot produce video in PAL format. As a result, devices must either designed to support a single standard, or to support multiple standards with additional hardware at greater cost. What is needed is a method for decoding analog video that does not require expensive video and audio decoder devices 30A, 30V and further can provide digital video and audio output in a standardized format that can be chosen (and changed) "on the fly" through software operating on the host computer 34, rather than through hardware replacement.

SUMMARY OF THE INVENTION

In light of the aforementioned problems associated with the prior devices and methods, it is an object of the present invention to provide a Video and Audio Front End Assembly and Method. The device and method of this invention should take advantage of the hardware improvements available in personal computing machines that enable higher speed bus communications and much greater computational capacity. The system should transfer many of the processes needed to convert analog video and audio inputs so that they are displayable on a personal computer from being hardware-based to being software-based. The system should combine a simplified hardware front-end interface between the computer and the analog input signals and a very flexible set of software applications running on the host computer. The hardware front end should employ an integrated circuit device that has much lower complexity and cost than the conventional audio/video decoder integrated circuit. The software back end should provide performance that is equal to or greater than the prior hardware-based systems, while also having the substantial benefit of being upgradable virtually without cost to respond to changing user requirements and technological evolutions in the decoding arena.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Video and Audio Front End Assembly and Method.

Figure 1:
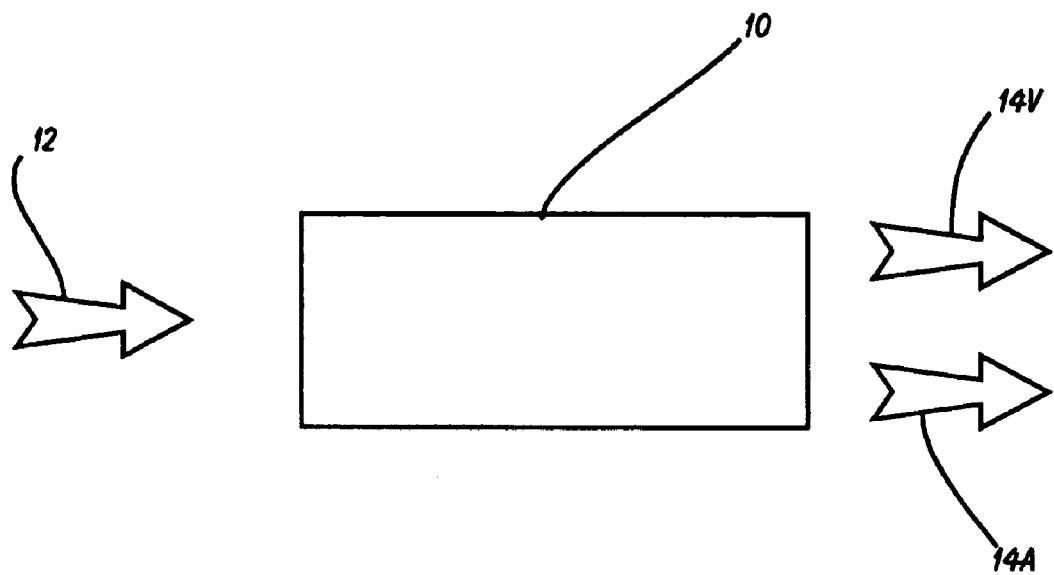
FIG. 1 depicts the general functionality of a conventional video decoding assembly.
Figure 2:
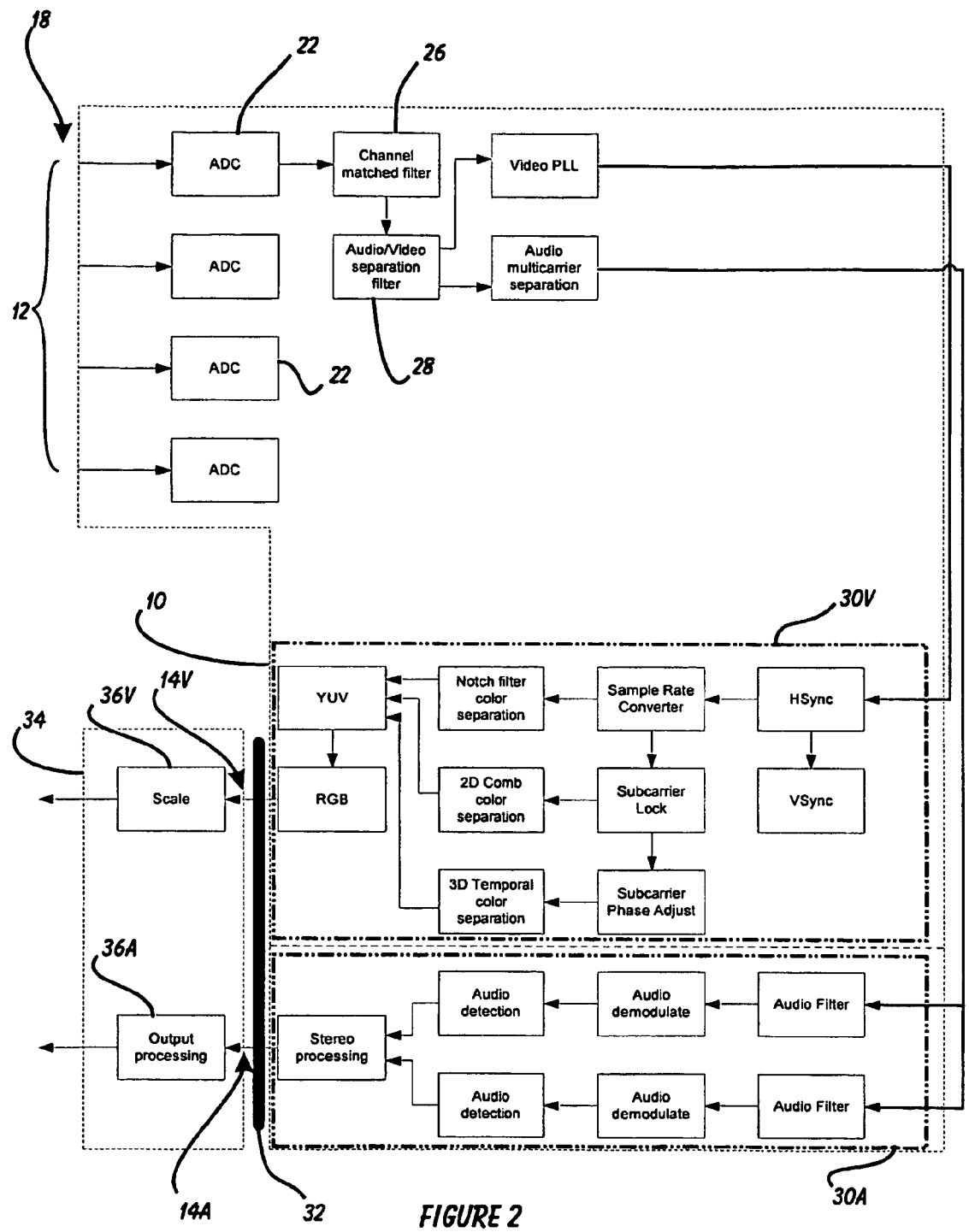
FIG. 2 is a block diagram depicting the subassemblies contained within the conventional video decoding assembly.
Figure 3:
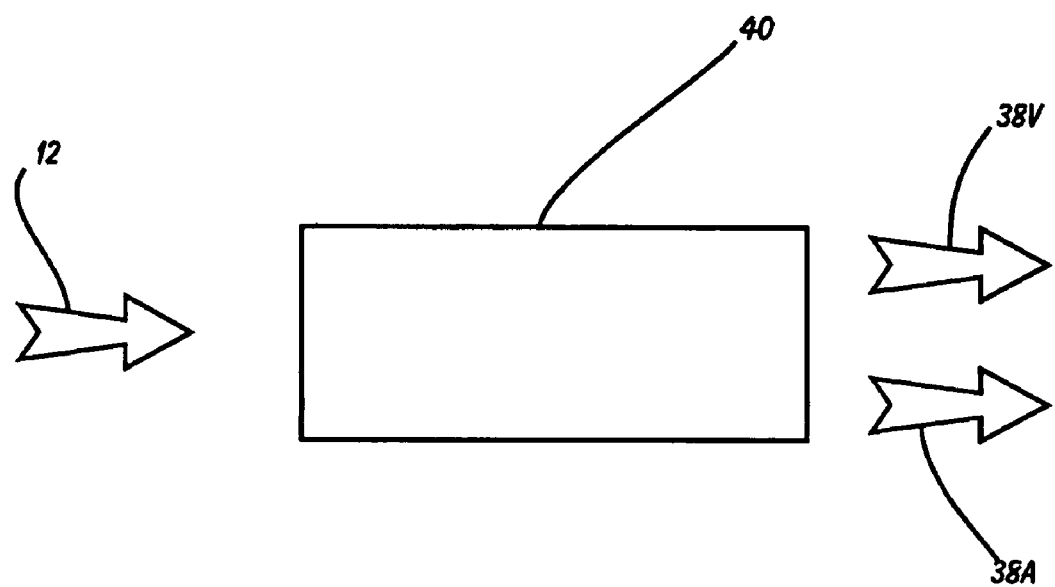
FIG. 3 depicts the general functionality of a preferred embodiment of the video and audio front end assembly of the present invention.

The present invention can best be understood by initial consideration of FIG. 3. FIG. 3 depicts the general functionality of a preferred embodiment of the video and audio front end assembly 40 of the present invention. Like the prior art, the assembly 40 of the present invention accepts analog video/audio data input 12. Unlike the prior art, however, the output is raw digitized video 38V and audio 38A in a (device) standard format (generically 38). The format 38 referred to here is not decoded digital video and audio in a standard format, but is rather digitized analog data that has not been fully decoded, but rather has been converted into an internally standardized format so that it can be further decoded in downstream equipment Now tuning to FIG. 4, we can examine the assembly of the present invention more closely.

Figure 4:
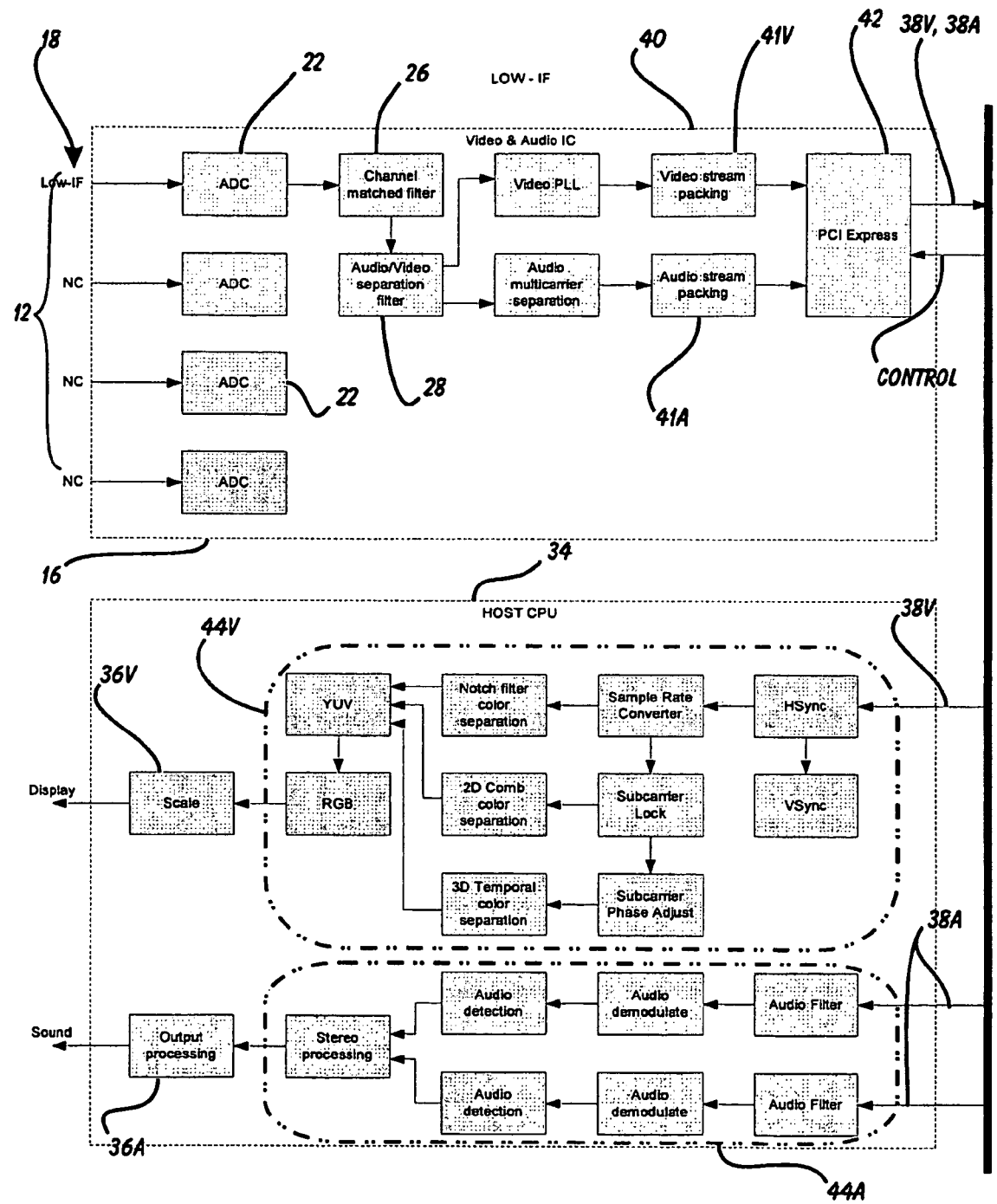
FIG. 4 is a block diagram depicting the device elements making up the video and audio front end assembly of FIG. 3 accepting a combined Low-IF video and sound input, in combination with the host computer and its software applications for interfacing with the present invention.

FIG. 4 is a block diagram depicting the device elements making up the video and audio front end assembly 40 of FIG. 3 accepting a combined Low-IF video and sound input, in combination with the host computer 34 and its software applications 44V, 44A and 36V, 36A for interfacing with the present invention. The circuit substrate 16 has a plurality of functional elements bonded electrically to it, including an interface to a PCI Express bus 42 (serial bus), rather than the regular PCI bus (parallel) used by the conventional video decoder assembly.

The analog input signal 12 enters the circuit at the input receptacles 18, where it is handled by a conventional analog front end (not shown) and analog to digital converter 22. Next, the signal is processed by the channel matched filter device 26 and separating/conversion device 28. Each of the aforementioned devices are essentially the same as are found in the conventional system.

What is new is that instead of now being decoded by video and audio decoder devices, the digitized analog data exiting the separating/conversion device 28 enters the data framing devices 41A and 41V (for framing of the separated, digitized audio and video data). The data framing devices 41A and 41V do not convert the raw digital data into standardized displayable digital video and playable digital audio, but instead only frames the raw digital data into a (device-configured) standard format, 38V and 38A, so that it can be easily manipulated by downstream software into decoded and displayable digital video and playable digital audio.

The framed raw digitized data 38V, 38A leaves the video and audio front end assembly 40 via the PCI Express bus 42 (4 bit vs 32 bit) on the host computer's 34 motherboard. The actual decoding of the raw digitized data is handled by video decoding 44V and audio decoding 44A software applications running on the host computer 34. The decode applications 44A and 44V convert the raw digitized data into the standardized display format (e.g. PAL or NTSC formats). The display software application 36V and sound software 36A then displays the digital video on a display device associated with the host computer 34 (e.g. the computer's monitor) and plays the sound through speakers operatively connected to the computer 34.

There are several substantial benefits to using hardware only to do "front end" conversions of the incoming analog video/audio data. First, the most expensive hardware device on the circuit substrate is eliminated. Second, by not taking the decoding process past data digitization and framing, there has been no commitment to any particular video display format. As a result, a single video and audio front end assembly architecture can support the creation of decoded digital video in virtually any standard display format (i.e. one card can generate video in either PAL or NTSC format). Third, since the video decoding is handled by the decode software application (44V and 44A, collectively 44), the system is completely upgradable at any time in the future. Using a strictly hardware-based system would not permit such upgrades. Third, under certain circumstances, as discussed below, where separate analog audio and video streams are inputted to the assembly 40, the device of FIGS. 3-8 can optimize the processing flow even more.

Figure 5:
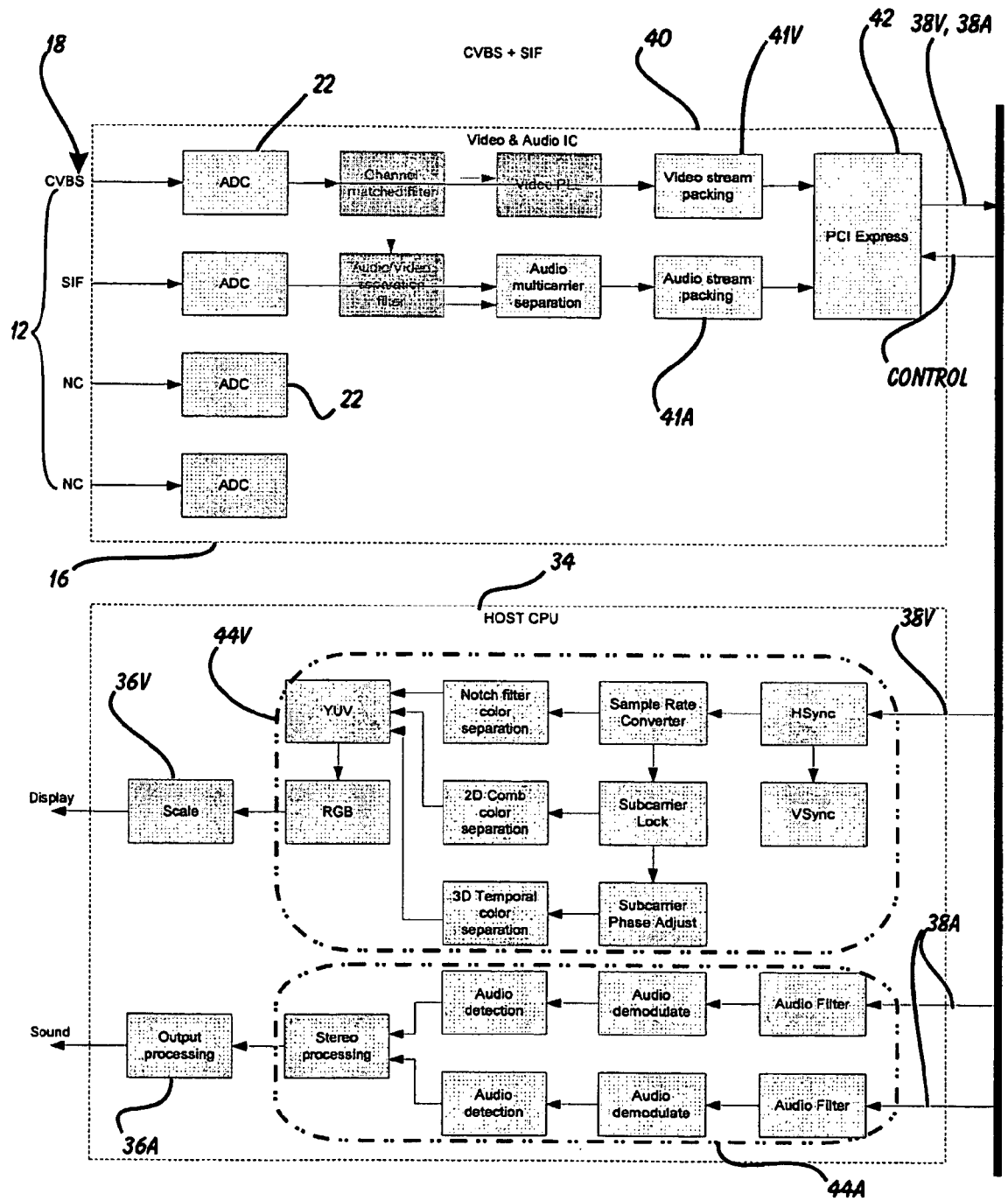
FIG. 5 is a block diagram depicting the device elements making up the video and audio front end assembly of FIGS. 3 and 4 accepting separate video and sound inputs in CVBS and SIF formats, in combination with the host computer and its software applications for interfacing with the present invention.

FIG. 5 is a block diagram depicting the device elements making up the video and audio front end assembly of FIGS. 3 and 4 accepting separate video and sound inputs in CVBS and SIF formats, in combination with the host computer 34 and its software applications 44V, 44A and 36V, 36A for interfacing with the present invention.

FIG. 5 depicts the general functionality of a preferred embodiment of the video and audio front end assembly 40 of the present invention as it handles separated audio and video data streams 12A (SIF) and 12V (CVBS), respectively. The assembly 40 is equipped to handle such pre-separated analog data streams much differently than the prior art. Under the prior art, all steps are executed on the incoming analog stream, whether separated or not because they are necessary in order to complete decoding. This slows down the data flow unnecessarily. In the device of the present invention (as discussed below), the separate analog streams, when present, will only undergo simple processing before being passed to the host computer for decoding. Under these circumstances, employment of the front end system of FIG. 6 becomes even more valuable.

When, as here, separate input streams 12V and 12A are received at the assembly 40, channel matching and separation steps are unnecessary. In response, the assembly 40 directs the digitized data stream directly to the data framing devices 41V and 41A to be packaged in the assembly-specific standard format.

Figure 6:
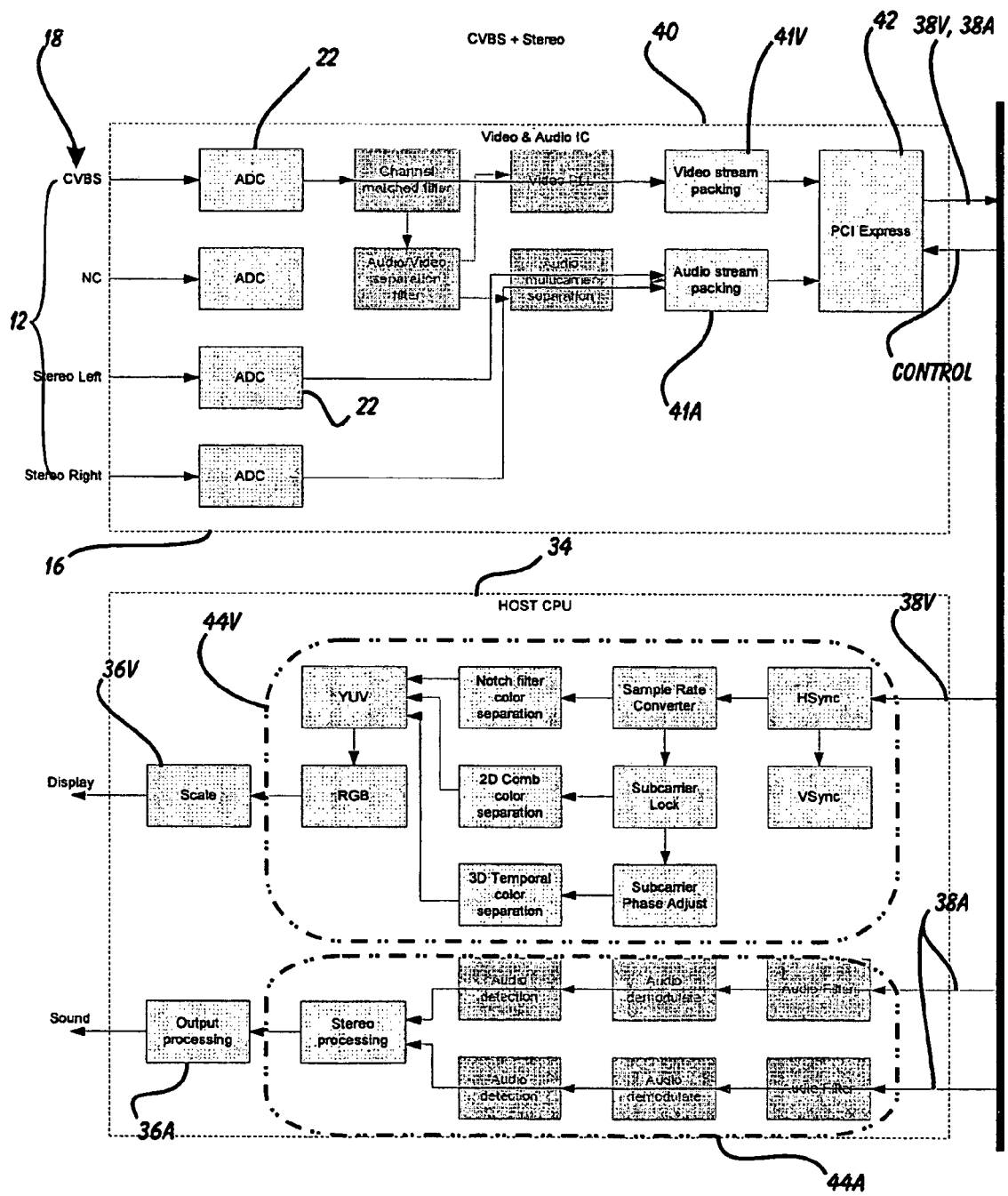
FIG. 6 is a block diagram depicting the device elements making up the video and audio front end assembly of FIGS. 3-5 accepting separate video and sound inputs in CVBS and stereo formats, in combination with the host computer and its software applications for interfacing with the present invention.

Once received by the host cpu 34, he framed digital data 38V, 38A is operated upon by the audio decode application 44A and the video decode application 44V, just as a mixed analog input signal would have been. The display and sound applications 36V and 36A then display and emit the video and audio, respectively. By transferring so much of the signal processing to the host computer 34, the assembly 40 has created efficiencies, processing speeds and flexibility that hasn't and isn't available through conventional hardware-intensive decoding assemblies. FIG. 6 provides another operational example of the device and method of the present invention.

FIG. 6 is a block diagram depicting the device elements making up the video and audio front end assembly 40 of FIGS. 3-5 accepting separate video and sound inputs in CVBS and stereo formats, in combination with the host computer 34 and its software applications 44V, 44A and 36V, 36A for interfacing with the present invention.

Figure 7:
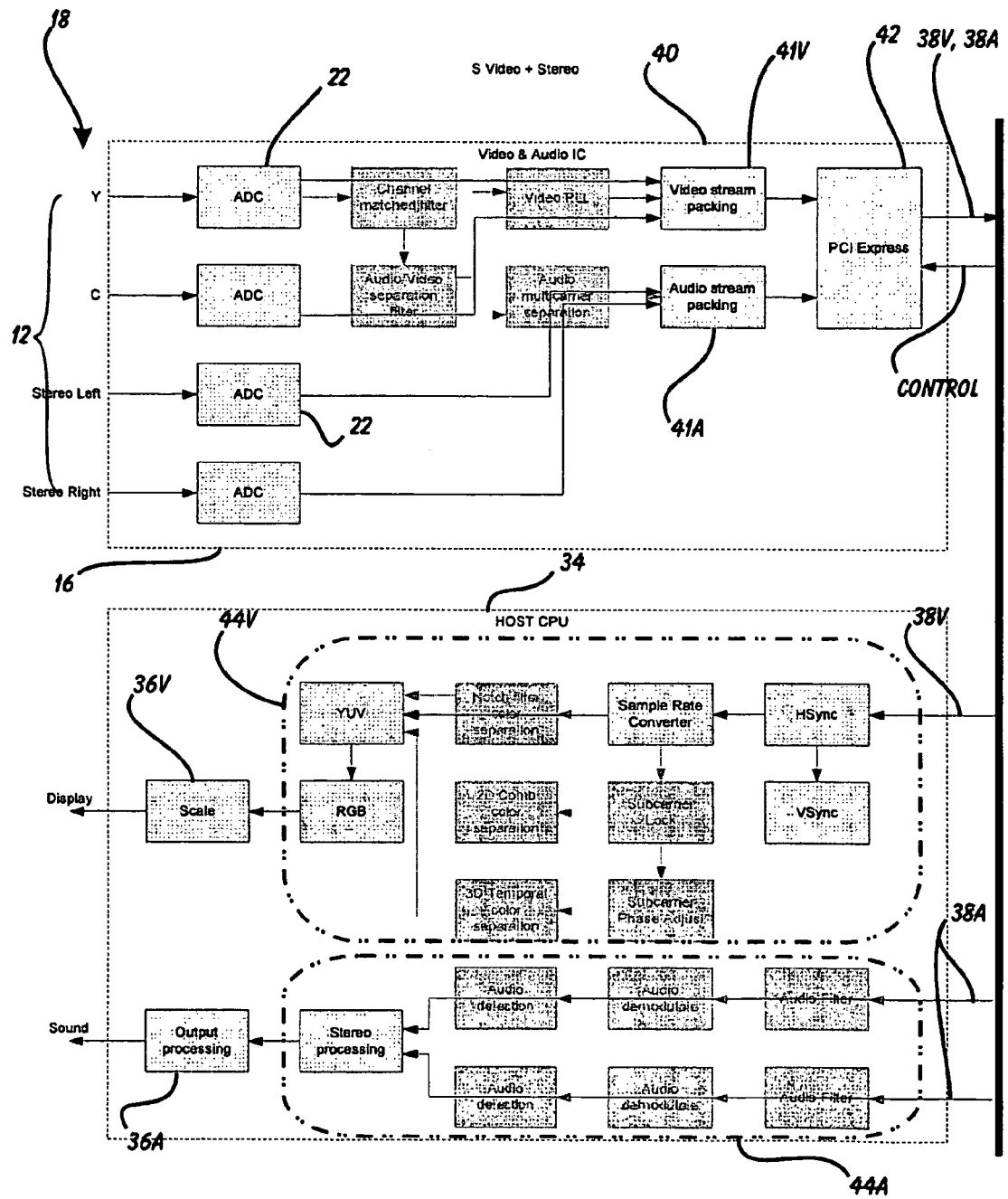
FIG. 7 is a block diagram depicting the device elements making up the video and audio front end assembly of FIGS. 3-6 accepting separate video and sound inputs in S-video and stereo formats, in combination with the host computer and its software applications for interfacing with the present invention.

Here, since the analog audio is already in separate, playable analog form, very little processing is necessary. Once packaged at 41A, the audio decode application 44A simply processes the stereo data and then the sound application 36A emits the sound through the host computer. Since the video is in CVBS format (as was the case in the example of FIG. 5), the same simplified video processing is conducted as was conducted in the system of that Figure. FIG. 7 gives another example of analog input stream format FIG. 7 is a block diagram depicting the device elements making up the video and audio front end assembly 40 of FIGS. 3-6 accepting separate video and sound inputs in S-video and stereo formats, in combination with the host computer 34 and its software applications 44V, 44A and 36V, 36A for interfacing with the present invention.

Here, the S-Video analog video input signal (abbreviated as Y and C) are already highly processed for display. As such, not only is no signal separation required, but the video decode application 44V also only conducts a subset of the available processing steps to the packaged digital video stream 38V. As a result, further speed optimization is obtained with this new approach to decoding analog audio and video as compared to the prior hardware-based systems. Finally turning to FIG. 8, we can examine the situation involving yet another set of analog input formats.

Figure 8:
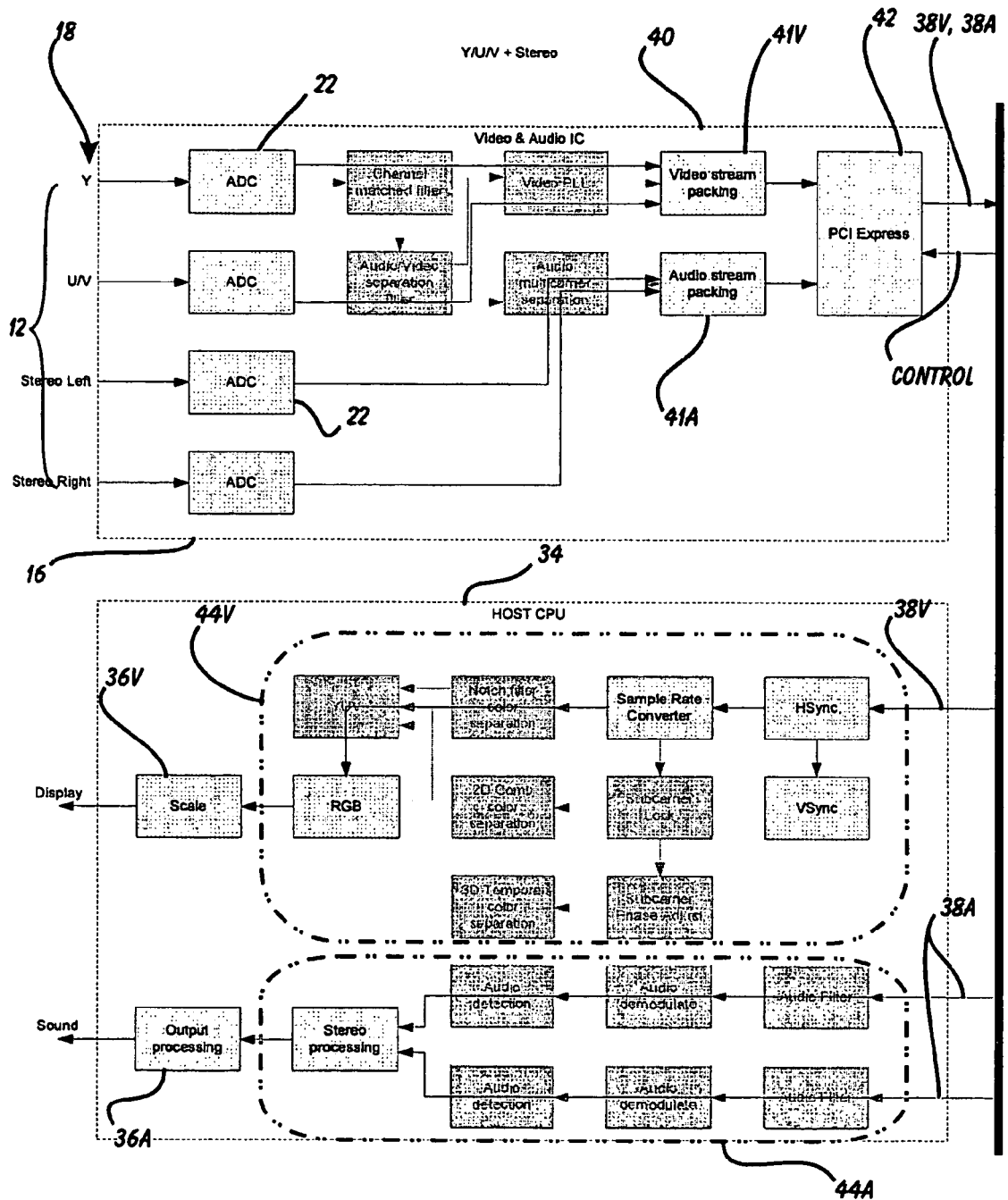
FIG. 8 is a block diagram depicting the device elements making up the video and audio front end assembly of FIGS. 3 and 4 accepting separate video and sound inputs in CVBS and SIF formats, in combination with the host computer and its software applications for interfacing with the present invention

FIG. 8 is a block diagram depicting the device elements making up the video and audio front end assembly 40 of FIGS. 3 and 4 accepting separate video and sound inputs in CVBS and SIF formats, in combination with the host computer 34 and its software applications 44V, 44A and 36V, 36A for interfacing with the present invention Here, the incoming video is in YUV format, which is actually displayable on analog equipment. Under these circumstances, virtually processing occurs by either the assembly 40 or the applications 44V and 44A. The display and emission of the video and audio requires almost no processing power from the host 34, and virtually nothing but digitizing, packaging and sending to the PCI express bus has been conducted by the assembly 40.

In summary, the assembly 40 and associated host-based decode software applications 44 are flexible and responsive to the input stream format. The form of the packaged output data streams 38V and 38A may be less- or more-highly processed, responsive to the format of the analog input stream(s). The prior art audio/video decoders assemblies were not this responsive—since the decoder chips are hardwired, their operational sequences are not very flexible. As a result, there is really no gain by providing subcircuits that can deactivate certain processing steps because the modified data would have to use a separate decoder chip to prepare it for display or emission by the host computer. Since such functionality would mandate duplication of the decoder chip(s), there would not be any cost advantage at all.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A video and audio front end assembly, comprising:
   a circuit substrate having at least one analog input receptacle and a digital output bus;
   an analog to digital converter electrically connected to each said analog input receptacle;
   a channel matched filter device electrically connected to said analog to digital converter devices;
   an audio and video signal separating filter device electrically connected to said channel matched filter device;
   a video data framing device electrically connected between said channel matched filter and audio and video signal separating filter and said digital output bus;
   an audio data framing device electrically connected between said channel matched filter device and said digital output bus;
   input format detection means for detecting the format of a data stream received at each said input receptacle; and
   filter/separation switch means responsive to said input format detection means for electrically connecting each said analog to digital converter device to said video data framing and said audio framing devices,
   wherein said filter/separation switch means responds to each separated video input data stream received at said analog input receptacle by electrically connecting said output from said analog to digital converter devices electrically connected to said input receptacles receiving said separated video input data streams to said video data framing device, whereby said separated video input data stream is not acted upon by said channel matched filter device or said audio and video signal separating filter.

2. The assembly of claim 1, wherein said filter/separation switch means responds to each separated audio input data stream received at said analog input receptacle by electrically connecting said output from said analog to digital converter devices electrically connected to said input receptacles receiving said separated audio input data streams to said audio data framing device, whereby said separated audio input data stream is not acted upon by said channel matched filter device or said audio and video signal separating filter.

3. The assembly of claim 2, wherein said digital output bus is a high speed serial bus.

4. A video and audio decoding system for converting analog input video into digital output video in standard display format, comprising:
a video and audio front end assembly for accepting said analog input video and audio and separating it into a video stream and an audio stream and converting it into digitized data, said front end assembly further comprising:
at least one analog input receptacle and a digital output bus;
input format detection means for detecting the format of a data stream received at each said input receptacle; and
filter/separation switch means responsive to said input format detection means for electrically connecting each said analog to digital converter device to said video data framing and said audio framing devices, with said format-detected data video and audio streams connected thereto are not acted upon by a channel matched filter device or audio and video signal separating filters; and
a video decoder routine for converting said digitized data into said digital output video in standard display format, said routine comprising a method being executed on a programmable microprocessor system having memory storage, a processing device, a display device in communication with said video decoder routine, and a communications bus in contact with said video and audio front end assembly for transferring said digitized data to said programmable microprocessor system.

5. The system of claim 4, wherein said video and audio front end assembly comprises:
a circuit substrate having said at least one analog input receptacle and said digital output bus;
an analog to digital converter electrically connected to each said analog input receptacle;
a channel matched filter device electrically connected to said analog to digital converter devices;
an audio and video signal separating filter device electrically connected to said channel matched filter device;
a video data framing device electrically connected between said channel matched filter and audio and video signal separating filter and said digital output bus; and
an audio data framing device electrically connected between said channel matched filter device and said digital output bus, said digital output bus interconnected to said computing device communications bus.

6. The system of claim 5, wherein said filter/separation switch means of said video and audio front end assembly responds to each separated audio input data stream received at said analog input receptacle by electrically connecting said output from said analog to digital converter devices electrically connected to said input receptacles receiving said separated audio input data streams to said audio data framing device, whereby said separated audio input data stream is not acted upon by said channel matched filter device or said audio and video signal separating filter.

7. The system of claim 6, wherein said filter/separation switch means of said video and audio front end assembly responds to each separated video input data stream received at said analog input receptacle by electrically connecting said output from said analog to digital converter devices electrically connected to said input receptacles receiving said separated video input data streams to said video data framing device, whereby said separated video input data stream is not acted upon by said channel matched filter device or said audio and video signal separating filter.

8. The system of claim 7, wherein said communications bus is a high-speed serial bus.

9. A video and audio decoding combination, comprising:
a first circuit assembly comprising a video and audio front end circuit assembly for accepting analog input video and audio streams and separating each said stream into a video stream and an audio stream and converting said video stream and said audio stream into digitized data; and
a video decoder routine for converting said digitized data into said digital output video in standard display format said routine comprising a method being executed on a programmable microprocessor system having memory storage, a processing device, a display device in communication with said video decoder routine, and a communications bus in contact with said first circuit assembly for transferring said digitized data to said programmable microprocessor system wherein
said digitized audio and video streams are not acted upon by a channel matched filter or audio and video signal separating filters within said first circuit assembly.

10. The combination of claim 9, wherein said first circuit assembly video and audio front end assembly comprises:
a circuit substrate having at least one analog input receptacle and a digital output bus;
an analog to digital converter electrically connected to each said analog input receptacle;
a channel matched filter device electrically connected to said analog to digital converter devices;
an audio and video signal separating filter device electrically connected to said channel matched filter device;
a video data framing device electrically connected between said channel matched filter and audio and video signal separating filter and said digital output bus; and
an audio data framing device electrically connected between said channel matched filter device and said digital output bus, said digital output bus interconnected to said computing device communications bus.

11. The combination of claim 10, wherein said first circuit assembly video and audio front end assembly further comprises:
input format detection means for detecting the format of a data stream received at each said input receptacle; and
filter/separation switch means responsive to said input format detection means for electrically connecting each said analog to digital converter device to said video data framing and said audio framing devices.

12. The combination of claim 11, wherein said filter/separation switch means of said first circuit assembly video and audio front end assembly responds to each separated audio input data stream received at said analog input receptacle by electrically connecting said output from said analog to digital converter devices electrically connected to said input receptacles receiving said separated audio input data streams to said audio data framing device, whereby said separated audio input data stream is not acted upon by said channel matched filter device or said audio and video signal separating filter.

13. The combination of claim 12, wherein said filter/separation switch means of said first circuit assembly video and audio front end assembly responds to each separated video input data stream received at said analog input receptacle by electrically connecting said output from said analog to digital converter devices electrically connected to said input receptacles receiving said separated video input data streams to said video data framing device, whereby said separated video input data stream is not acted upon by said channel matched filter device or said audio and video signal separating filter.

14. The combination of claim 13, wherein said digital output bus and said communications bus are compatible with a high-speed serial bus.

* * * * *